United States Patent [19]

Fisher et al.

[11] Patent Number: 4,969,258
[45] Date of Patent: Nov. 13, 1990

[54] INSERTING PINS INTO PRINTED CIRCUIT BOARDS

[75] Inventors: James Fisher, Georgetown; Charles C. Balkenhol, Islington; Leo B. Roberts, Ottawa, all of Canada

[73] Assignee: Northern Telecom Limited, Montreal, Canada

[21] Appl. No.: 373,008

[22] Filed: Jun. 29, 1989

[51] Int. Cl.⁵ .......................... H05K 3/00; B23P 19/00
[52] U.S. Cl. ......................................... 29/845; 29/739; 227/135
[58] Field of Search .......................... 29/739, 845, 885; 227/135, 178

[56] References Cited

U.S. PATENT DOCUMENTS

| | | | |
|---|---|---|---|
| 3,769,679 | 11/1973 | Kendall | 29/739 X |
| 4,265,508 | 5/1981 | Chisholm | 439/885 |
| 4,372,044 | 2/1983 | Chisholm | 29/845 |
| 4,397,341 | 8/1983 | Kent | 29/845 X |
| 4,467,523 | 8/1984 | Chisholm | 29/845 |
| 4,513,498 | 4/1985 | Kent | 29/845 |
| 4,627,161 | 12/1986 | Cushman | 29/845 X |
| 4,825,538 | 5/1989 | Kubis | 29/845 |

Primary Examiner—Carl E. Hall
Assistant Examiner—Carl J. Arbes
Attorney, Agent, or Firm—R. J. Austin

[57] ABSTRACT

Simultaneous multiple pin insertion into a printed circuit board in which the pins are held by a carrier with the pins initially having ends located within holes in the board with the pins supporting the carrier above the board. The carrier is then urged towards the board conveniently by press head operation to drive the pins through the board. Conveniently the press head also operates with a pin straightener, after pin insertion, the press head being reciprocable in two horizontal directions to perform a pin straightening operation.

6 Claims, 5 Drawing Sheets

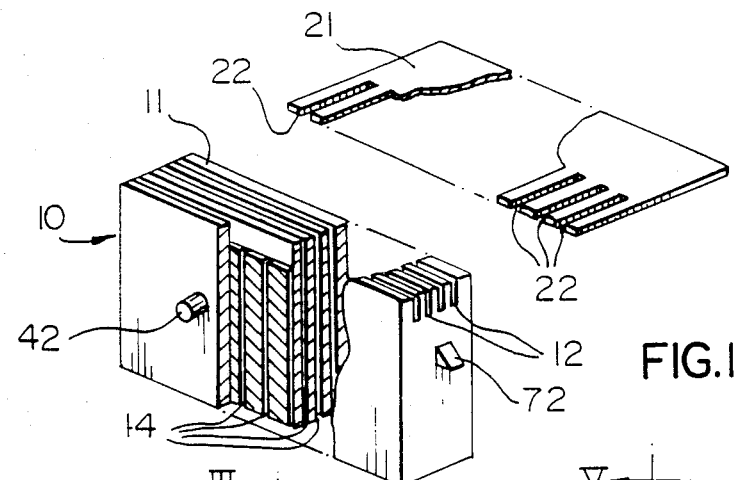
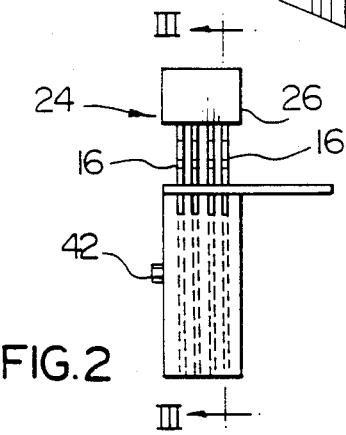
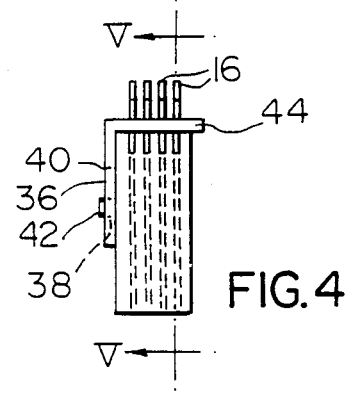
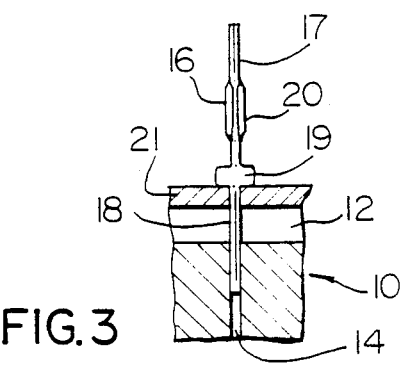
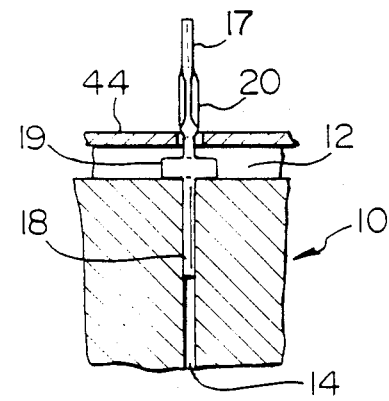
FIG.1
FIG.2
FIG.3
FIG.4
FIG.5

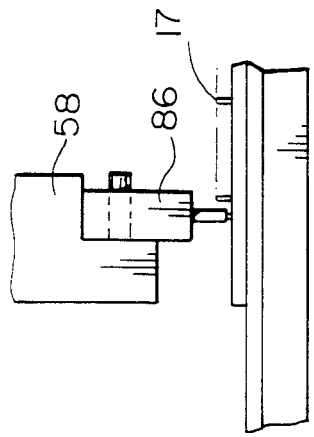
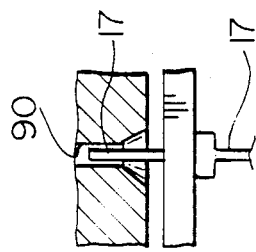
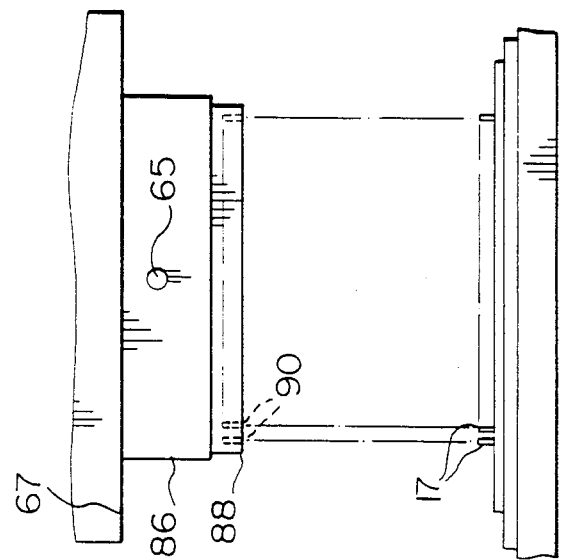
FIG. 13
FIG. 14
FIG. 12

INSERTING PINS INTO PRINTED CIRCUIT BOARDS

This invention relates to the insertion of pins into printed circuit boards.

Pins are conventionally inserted into a printed circuit board by carrying the pins vertically downwards on a carrier which forces them into aligned holes in the board. This insertion procedure presents no insurmountable problems when pins are inserted individually and sequentially in their respective holes. However, in other pin insertion processes multiple pins are inserted simultaneously into corresponding holes in a printed circuit board, all of the pins being held by a single carrier spaced vertically above the holes, downward movement of the carrier providing the simultaneous insertion. For pin insertion, the parts of the pins to pass into and through a board necessarily project downwards from the carrier. A problem which exists when multiple pins having resiliently compliant portions are to be inserted is that it may be extremely difficult, if not impossible, to align all of the pins with their corresponding holes. It follows that pin misalignment results in breakage of certain pins when these pins are brought into contact with the printed circuit board under insertion pressure. In some cases, the engagement of a surface of a printed circuit board with an end of a pin results in irreparable damage to the surface of the board. In other cases, which occur in a high percentage of printed circuit boards to which multiple pins with compliant portions are applied simultaneously, a time consuming and costly procedure follows to complete the assemblies in that manual labor is required to insert new pins into holes where pin breakage has occurred or in cases where pins are completely missing from certain holes.

The present invention seeks to provide a method and apparatus which avoids or lessens the above problems.

According to one aspect of the present invention there is provided a method for simultaneously inserting a plurality of pins having compliant portions into a printed circuit board comprising disposing and holding the pins in fixed apart positions in a pin carrier with the pins extending from one side of the carrier; disposing the carrier with said one side facing a printed circuit board and with the pins located in initial positions with lower projecting ends of the pins located within individual holes in the printed circuit board, the pins holding the carrier spaced above the board; and then urging the carrier towards the printed circuit board with the carrier applying a driving force to the pins to insert them further into the board until they assume final desired positions within the board.

By the above method according to the invention, the vertical movement from a spaced position of the pins above the board is avoided together with any attendant pin misalignment. Clearly, with the present invention, before the carrier applies the driving force, all of the pins must be in the initial positions with their lower ends projecting into their respective holes so that alignment is ensured. Pin breakage cannot occur because of misalignment in the method according to the invention and also there can be no instances of missing pins after the pin insertion process.

The invention also includes an apparatus for simultaneously inserting a plurality of pins having compliant portions into a printed circuit board comprising a support for the printed circuit board, a pin carrier for holding pins depending from the carrier with lower ends of the pins disposed in holes in the printed circuit board and with the carrier spaced above the printed circuit board, and a downwardly drivable carrier urging means, said urging means movable from a position above the support and the pin carrier and into engagement with the carrier to urge the carrier towards the support and force the pins into final desired positions in the printed circuit board.

In pin insertion practice, it is known that, particularly in the case of pins having compliant portions for insertion within the boards, deformation of the compliant portions during insertion causes end portions of the pins to become bent from the longitudinal axis of the pins. These bent end portions extend from a lower surface of a printed circuit board as the pins are being inserted. As a result, ends of the pins do not lie at specific desired distances apart so that assembly of connectors to these end portions presents alignment difficulties. Hence, pin straightening procedures are necessary after inserting such pins into printed circuit boards.

The present invention also seeks to provide a method and apparatus for serving both to insert pins while minimizing pin breakage and also enables a pin straightening procedure to be performed.

According to a further aspect of the present invention, a method is provided for simultaneously inserting a plurality of pins having compliant portions into holes in a printed circuit board and then for straightening the pins after insertion into the board comprising: disposing and holding the pins in fixed apart positions in a pin carrier with the pins extending from one side of the carrier; disposing the carrier with said one side facing a first side of a printed circuit board and with the pins located in initial positions with lower projecting ends of the pins located within individual holes in the printed circuit board, the pins holding the carrier spaced above the first side of the board; drivably moving a carrier urging means downwardly upon a downwardly movable head to contact and urge the pin carrier towards the printed circuit board so that it applies a driving force to the pins to insert them further into the board until they assume final desired positions with their lower ends projecting from a downwardly facing second side of the board; inverting the board to locate it with its second side facing upwardly and said pin ends projecting upwardly; downwardly moving a pin straightening means mounted upon the head to engage around said projecting ends of the pins; and relatively horizontally moving the head and the support to provide relative reciprocation of the pin straightening means and the printed circuit board in two horizontal directions to straighten any bent projecting pin ends.

The invention also includes apparatus for simultaneously inserting a plurality of pins having compliant portions into holes in a printed circuit board and then for straightening the pins after insertion into the board comprising: a support for supporting a printed circuit board with a first side of the board facing upwards; a pin carrier for holding pins depending from the carrier in initial positions with ends of the pins within individual holes in the printed circuit board with the carrier spaced above the board; a head located above the support and being drivable towards the support; a carrier urging means mountable upon the head for downward movement with the head to bring the carrier urging means into engagement with the carrier to urge the carrier towards the printed circuit board to force the pins into final desired positions in the board with said pin ends projecting from a downwardly facing second side of the board; and a pin straightening means mountable upon the head for downward movement to engage with said projecting ends of the pins when the printed circuit board is inverted to locate its second side facing upwardly and said pin ends projecting upwardly; and means for producing relative horizontal movement of the head and the support to relatively reciprocate the pin straightening means and the support in two horizontal directions to produce a pin straightening operation.

One embodiment of the invention will now be described by way of example, with reference to the accompanying drawings, in which:

FIG. 1 is an isometric view of part of a pin carrier of a pin insertion apparatus and a pin guide for use with the carrier;

FIG. 2 is an end elevational view in the direction of arrow II in FIG. 1 of the assembled pin carrier and pin guide and showing insertion of pins into the carrier;

FIG. 3 is a cross-sectional view taken along line III—III in FIG. 2 and to a larger scale, to show a pin position in the carrier;

FIG. 4 is a view similar to FIG. 2 of the pin carrier after removal of the pin guide and location of a pin retainer upon the carrier;

FIG. 5 is a cross-sectional view taken along line V—V in FIG. 4 and to a larger scale, to show another pin position in the carrier;

FIG. 12 is a view of the apparatus in the direction of arrow XII in FIG. 11;

FIG. 13 is a view of the apparatus similar to FIG. 11 with the pin straightening means lowered onto ends of pins mounted in the board; and FIG. 14 is an enlarged cross-sectional view through part of the pin straightening means and printed circuit board during a pin straightening operation.

Figure 7:
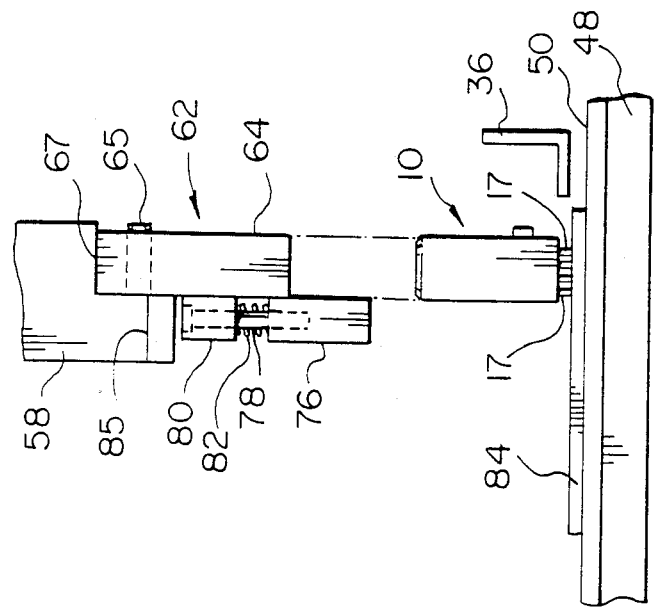
FIG. 7 is a side elevational view of part of the apparatus of FIG. 6 to the scale of FIGS. 1, 2 and 4, and showing one stage during the insertion of pins into a printed circuit board.

As shown in FIG. 1, apparatus for simultaneously inserting a plurality of pins into holes in a printed circuit board comprises an elongate pin carrier 10 formed along one side 11 with four rectangular section grooves 12. From the bases of the grooves 12, individual holes 14 extend further into the carrier. The holes 14 are location holes for slidable reception of ends of printed circuit board pins 16 (FIGS. 2 and 3), the holes thus being in four rows, one row to each groove 12. The distances between the rows of holes and between holes in each row correspond to distances between rows of holes in a printed circuit board into which the pins are to be inserted. Each pin 16 is of conventional construction and has two aligned end portions 17 and 18 and, between the end portions, an abutment portion 19 of greater lateral dimension, and a compliant portion 20 of any desired configuration.

A pin guide 21 is used to guide all of a groups of pins simultaneously into respective holes 14. The guide 21 comprises a planar comb element with teeth defining pin guide slots 22 along the guide, the slots being spaced apart the distance of the holes 14 in each row 12. The guide 21 is disposed along the side 11 of the carrier 10, (FIGS. 2 and 3), location means (not shown) being provided to ensure desired positioning of carrier and guide longitudinally of the carrier so that the slots 22 crossing the grooves provide guide windows for guiding pins into the holes 14.

Printed circuit board pins 16 are inserted into the holes 14 from a pin and base assembly 24 of conventional form. This assembly (FIG. 2) comprises a base 26 having pins attached to the base by one end 17 of each pin, the pin spacing corresponding to the distances between the holes 14 and the rows of holes.

To insert the pins simultaneously into the holes 14 of the carrier, the assembly 24 is lowered so that the ends 18 of the pins pass through the windows provided by the crossing grooves 12 and slots 22 to be guided thereby into the holes 14. The downward movement ceases when the abutment portion 19 engages the upper surface of the guide 21 as the abutment portions 19 are too wide to pass through the slots 22. This is the position shown in FIG. 2 in which the compliant sections 20 are above the abutment portions 19.

The pin guide 21 is then removed horizontally towards the right as viewed in FIG. 2, thus removing the support for the abutment portions 19 of the pins and allowing the pins to drop further into the grooves 12 until the abutment portions 19 engage the bottoms of the grooves 12 (FIG. 5). In this position, the abutment portions 19 lie completely beneath the side 11 of the carrier. The base 26 is then broken from the pins 16 and a pin retainer 36 is assembled to the pin carrier, as shown by FIG. 4. The pin retainer 36 is L-shaped in section and has at least two holes 38 (one being shown) in one leg 40 for guiding the retainer horizontally from the left in FIG. 4, onto the pin carrier by reception of guide pins 42 of the carrier into the holes 38. The other leg 44 of the retainer is a comb element similar to that of the pin guide 18. As the retainer is assembled onto the carrier 10, the slots of the leg 44 receive the pins 16 projecting from the carrier. This is the position shown in FIGS. 4 and 5. With the retainer assembled onto the carrier, the carrier and retainer may be inverted from the position of FIGS. 4 and 5 to that of FIG. 7 with the retainer holding the pins in the holes 14 by virtue of the fact that the abutment portions 19 in the grooves 12 engage and are supported by the retainer leg 44.

Figure 6:
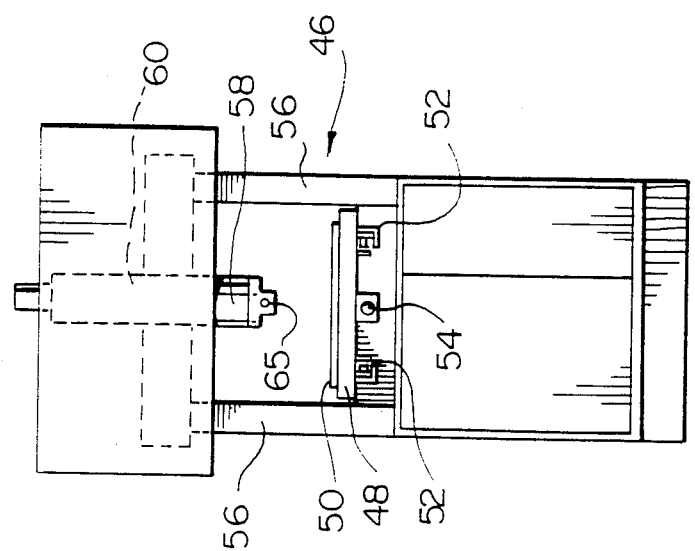
FIG. 6 is a front elevational view of the pin insertion apparatus shown to smaller scale than FIGS. 1 to 5.
Figure 9:
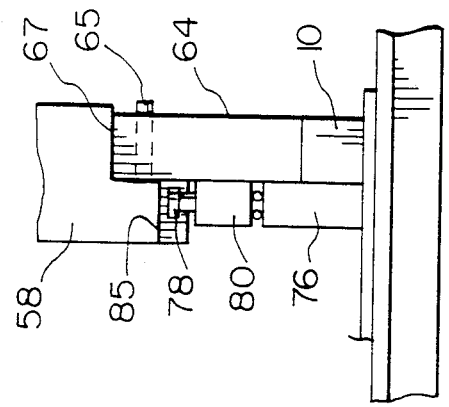
FIG. 9 is a view similar to FIG. 7 showing the apparatus at the end of a pin insertion stroke.

The apparatus also includes a press 46 (FIG. 5). The press 46 comprises a lower portion having a press tooling plate 48 supporting a platen 50. The tooling plate and platen are controllably movable in a horizontal plane normal to the plane of FIG. 6 in guides 52 by means of a screw thread drive mechanism 54. This type of movement is well known for location purposes and will be described no further. An upper part of the press supported by vertical columns 56 carries a machine head 58 having a press head 60 above the machine head for controllably moving the machine head vertically towards and away from the platen. This construction is also well known and will be described no further. In addition, the press head and machine head are movable horizontally in a plane at right angles to the movement of the tooling plate and platen (by conventional means, not shown), the combined movements of the machine head and the platen thus enabling the machine head to be controllably disposed above any desired location of the platen.

Figure 8:
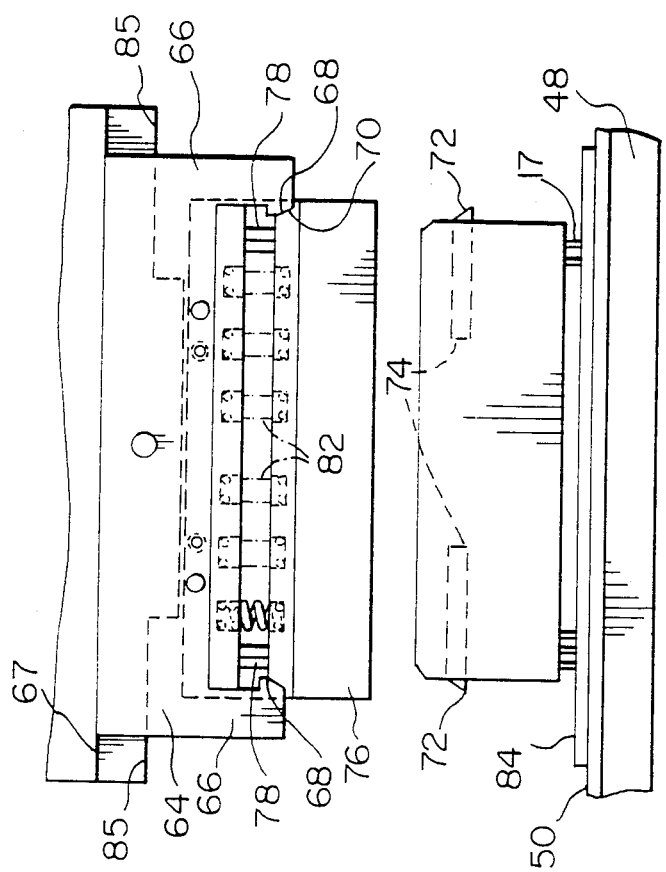
FIG. 8 is a view of the part of the apparatus of FIG. 7 taken in the direction of arrow VIII in FIG. 7.

As shown in FIGS. 7 and 8, a carrier urging means 62 forms part of the apparatus and is used in a manner to be described to force pins into final desired positions in the board. The carrier urging means 62 comprises a rigid planar body 64 having two depending ends 66 which form the body into yoke-shape as shown by FIG. 8. The body 64 is mountable upon the head 58 by reception of a mounting spigot 65 of the head through a complementary hole in the body 64 with an upper surface of the body engaging a downwardly facing surface 67 of the head 58 for transmitting downwardly directed pressing forces.

Opposing abutment shoulders 68 extend inwardly from the lower parts of the ends 66. The distance between opposing inner surfaces of the abutment shoulders 68 is such as to comfortably receive between them the length of the carrier 10 during downward movement of the urging means 62 as will be described. Lower edges 70 of the shoulders are inclined as shown in FIG. 8 for engagement with two complementary tapered ends 72 of pins 74 horizontally disposed in opposed axial alignment within the carrier 10 with their tapered ends projecting from the carrier. The pins are resiliently urged outwards from opposite ends of the carrier 10 against internal stops of the carrier by compression springs (not shown). Hence, as the body 64 is moved downwardly in correct alignment with the carrier 10, the carrier enters between the shoulders 68 and, during continued downward movement of the body, the surfaces 72 engage the surfaces 70 thereby forcing the pins 74 resiliently inwardly of the carrier to enable the carrier to enter completely into the space between the ends 66 of the urging means. In the final position (FIG. 10), the pins 74 are disposed above the shoulder 68 so that the pins 74 are urged outwardly into their normal positions whereby the pins 74 are supported upon the shoulders 68. This enables the body 64 to raise the carrier 10 upon subsequent upward movement of the body.

The carrier urging means 62 also comprises a resilient damping means to ensure that loads applied from the head to a printed circuit board supported by the platen are applied in progressively increasing fashion and are reduced in a similar manner upon removal of the head. This damping means comprises a metal block 76 which is carried by slidable dowels 78 in a lateral extension 80 of the body 64. The block 76 is urged away from the extension 80 by a plurality of compression springs 82 which normally cause the block 70 to depend downwardly from one side of the body 64 as shown by FIG. 7.

In use of the apparatus for inserting pins into a printed circuit board 84, the printed circuit board 84 is secured exactly in a desired position upon the platen as shown in FIGS. 7 and 8. The assembly of carrier 10 and pin retainer 36 is inverted from the position shown in FIG. 4 to that of FIG. 7 and is disposed with the pins 16 in initial positions, i.e. with the ends 17 of the pins 16 located slightly within individual holes in the printed circuit board. The pin retainer 36 is then removed horizontally towards the right as shown in FIG. 7 so that the carrier 10 is held spaced above the printed circuit board by the ends 28 of the pins located in the entrances to the holes in the board.

The platen and tooling plate on the one hand and the press head and machine head on the other hand are then relatively and controllably moved horizontally by computer operation to dispose the urging means 62 in a position directly above the carrier 10 (FIG. 7) to enable the urging means to apply a downward force to the carrier for pin insertion. The press head 60 is then operated to move the machine head 58 and the urging means 62 downwardly. The body 64 is thus caused to engage and then to apply a downward force to the carrier 10 whereby the carrier is moved downwardly to force the pins 16 through the printed circuit board and into final desired positions in the board with the compliant portions 20 disposed in electrical engagement with conductive material in the holes in the board. From a comparison of FIGS. 7 and 8 and FIGS. 9 and 10 it can be seen that during the downward movement, the metal block 76 engages the surface of the printed circuit board before the body 64 engages the carrier 10 and subsequent downward force is somewhat absorbed by compression of the compression springs 82. Movement of the block 76 relative to the extension 80 is permitted by movement of the dowels 78 through the extension, clearance being allowed between a surface 85 of the head 58 and each dowel head.

Figure 10:
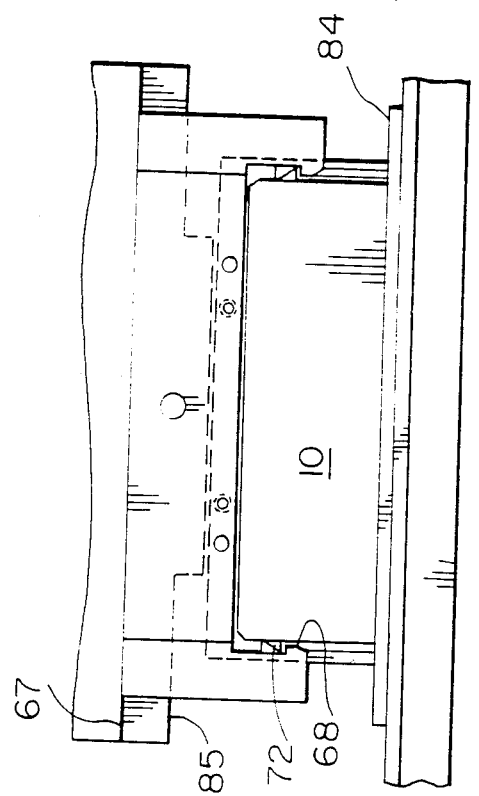
FIG. 10 is a view of the apparatus in the direction of arrow X in FIG. 9.

In addition to this and as described above, the carrier 10 moves between the shoulders 68 of the body 64 until the carrier lies in the position shown in FIG. 10 in which the pins 74 lie above the shoulders. As the machine head is raised after pin insertion, therefore, the body 64 lifts the carrier 10 away from the pins thereby leaving the pins with body ends 17 and 18 projecting freely from opposite sides of the printed circuit board. The whole of the pin insertion operation is then repeated as necessary to insert other pins into the board from other carriers 10, the machine head 56 and the platen being relatively moved as necessary to enable the urging means to be disposed correctly in position above each carrier in turn for the insertion operation.

Upon insertion of the pins into the board, it is known that because of deformation of the compliant sections of the pins 16, then the ends 17 of the pins may be bent slightly from the longitudinal direction of the pins so that the ends 17 are not in desired positions apart for subsequent connection. The apparatus of the embodiment and according to the invention not only enables the pins to be inserted into the board, but is also capable of straightening ends of the pins after pin insertion. For this purpose, the apparatus is provided with a pin straightening means which is mountable upon the head after removal of the urging means 62. The pin straightening means comprises a pin straightening bar 86 as shown in FIGS. 11 to 14. From one side of the bar 86, there is a depending narrow extension 88 which extends longitudinally of the bar. This extension 88 has one row of pin receiving holes 90 spaced apart along the length of the extension for accommodating the ends 17 of each row of the pins 16 successively across the board 84. Holes 90 are countersunk at an angle of 45° to a depth of 0.10 inches (FIG. 14) for guiding the pins 16 into the holes 90 as the bar is lowered onto a row of pins. The bar 86 has a tooling hole for reception of the mounting spigot 65 of the machine head. The position of the tooling hole is such that a surface of the bar 86 remote from the extension 48 will engage the undersurface 67 of the machine head when the bar 86 is assembled to the head.

Figure 11:
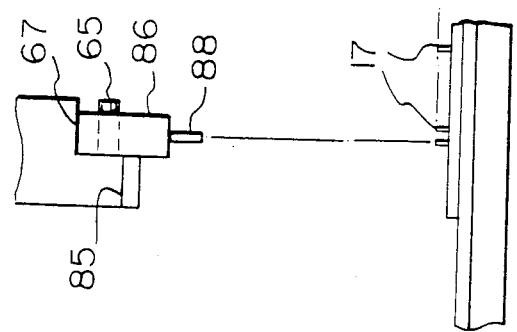
FIG. 11 is a view similar to FIG. 7 showing a carrier urging means replaced by a pin straightening means.

To straighten the ends 17 of the pins which depend downwardly from the printed circuit board after pin insertion, it is first necessary to invert the board from the position shown in FIGS. 7 to 10 to the position shown in FIG. 11 so that the ends 17 project upwardly. With the carrier urging means 62 removed, the bar 86 is disposed in position upon the head as described. The pin straightening operation then commences. For this purpose, the apparatus is computer controlled so that the head and platen move relative to each other to locate the bar 86 above each row of holes in succession, and after location above a particular row of holes, the head moves downwardly so that the pin ends 17 pass into the holes 50.

Apart from controlling pin insertion, the computer provides a means for providing relative horizontal reciprocating movement of the head and the platen first in one horizontal plane and then in another horizontal plane so that each of the pins being straightened is flexed by the bar for alignment purposes. Thus the head is moved from the position shown in FIG. 11 to that shown in FIG. 13 to perform pin straightening and the pins are inserted into the holes for a sufficient distance as shown in FIG. 14 for the pin straightening operation to be effective. In one particular method of straightening the pins in all the rows, the machine is programmed such that after initiation of the program, the head 58 is moved to a first location above one row of holes and the operator initiates computer control for the downward movement at that row by button operation. The head is moved downwardly into the pin straightening position (FIG. 13) and the reciprocating pin straightening motion takes place under computer control. After termination of this operation, the upward movement of the head is under the operator's control. Upon the head returning to its upper position as shown in FIG. 11, it then moves to a second location above a succeeding row of holes at which the procedure for pin straightening is repeated.

As can be seen from the above description of the embodiment, the invention provides a single apparatus for inserting pins into a printed circuit board and for pin straightening pins after their insertion into the board. More importantly, the method for pin insertion ensures the avoidance of broken or missing printed circuit board pins.

What is claimed is:

1. A method for simultaneously inserting a plurality of pins having compliant portions into a printed circuit board in which each of the pins has two end portions separated by an abutment portion and its compliant portion comprising:
   disposing the pins in fixed apart positions with one end portion of each pin in a pin carrier and with the compliant portions and the other end portions of the pins extending from one side of the carrier;
   with the pins separate from one another disposing the carrier with said one side facing a printed circuit board, with the other end portions of the pins extending downwardly towards the printed circuit board and with the pins held within the carrier by a pin retainer located beneath the abutment portions to support the pins and above the compliant portions;
   lowering the carrier towards the printed circuit board to a stationary position of carrier and pins in which the other end portions of the pins are disposed with their end located within individual holes int eh printed circuit board, the pins holding the carrier spaced above the board;
   removing the pin retainer from beneath the abutment portions of the pins;
   and then urging the carrier towards the printed circuit board with the carrier applying a driving force to the pins to insert them further into the board until they assume final desired positions in the board and with their compliant portions held within the holes.

2. A method for simultaneously inserting a plurality of pins having compliant portions into holes in a printed circuit board and for straightening the pins after insertion into the board comprising:
   disposing and holding the pins in fixed apart positions in a pin carrier with compliant portions of the pins extending from one side of the carrier;
   disposing the carrier with said one side facing a first side of the printed circuit board and with the pins located in initial positions with lower projecting ends located within the individual holes int he printed circuit board, the pins holding the carrier spaced above the first side of the board;
   drivably moving a carrier urging means downwardly upon a downwardly movable head to contact and urge the pin carrier towards the printed circuit board so that it applies a driving force to the pins to insert them further into the board until they assume final desired positions with their compliant portions held within the holes and their lower ends projecting from a downwardly facing second side of the board;
   inverting the board to locate it with its second side facing upwardly and said pin ends projecting upwardly;
   downwardly moving a pin straightening means mounted upon the head to engage around said projecting ends of the pins;
   and relatively horizontally moving the head and the support to provide relative reciprocation of the pin straightening means and the printed circuit board in two horizontal directions to straighten any bent projecting pin ends.

3. A pin insertion apparatus for simultaneously inserting a plurality of pins into a printed circuit board, the pins each having two end portions separated by an abutment portion and a compliant portion, the apparatus comprising:
   a support for the printed circuit board;
   a pin carrier for disposing the pins in fixed apart positions with the one end portions of the pins located within the carrier and compliant portions and the other end portions depending from one side of the carrier;
   a pin retainer attachable to the carrier to opposed said one side of the carrier for location between the abutment and compliant portions and for engagement with the abutment portions so as to support the pins, the assembled pin carrier and pin retainer locatable above the support so as to locate the other end portions of the pins in a stationary position with their ends located within individual holes in the printed circuit board;
   and a downwardly drivable carrier urging means, said urging means movable on a pin insertion stroke, with the pin carrier located above the support and with the pin retainer removed, the urge the carrier towards the support and force the pins into final desired positions within the board and with their compliant portions held within the holes.

4. Apparatus according to claim 3 wherein the carrier urging means is detachably mountable upon a downwardly movable head.

5. Apparatus for simultaneously inserting a plurality of pins having compliant portions into holes in a printed circuit boar and then for straightening the pins after insertion into the board comprising:

a support for supporting a printed circuit board with a first side of the board facing upwards;

a pin carrier for holding pins with their compliant portions depending from the carrier in initial positions with ends of the pins located within individual holes in the printed circuit board with the carrier spaced above the board;

a head located above the support and being drivable towards the support;

a carrier urging means mountable upon the head for downward movement of the head to being the carrier urging means into engagement with the carrier to urge the carrier towards the board to force the pins into final desired positions int he board with their compliant portions held within the holes and said pin ends projecting from a downwardly facing second side of the board; and a pin straightening means mountable upon the head for downward movement to engage with said projecting ends of the pins with the printed circuit board inverted to locate its second side facing upwardly and said pin ends projecting upwardly, the head and the support being relatively horizontally reciprocable in two horizontal directions to provide a pin straightening operation.

6. A pin insertion apparatus for simultaneously inserting a plurality of pins into a printed circuit board, the pins each having two end portions separated by an abutment portion and a compliant portion, the apparatus comprising:

a support for the printed circuit board;

a pin carrier for holding pins depending from the carrier with lower ends of the pins disposed in holes in the printed circuit board and with the carrier spaced above the printed circuit board;

a downwardly drivable carrier urging means, said urging means movable on a pin insertion stroke from a position above the support and the pin carrier and into engagement with the carrier to urge the carrier towards the support and force the pins into final desired positions in the board with their compliant portions held within the holes;

and cooperable holding means of the pin carrier and the carrier urging means, the cooperable holding means comprising spring loaded pins mounted upon the pin carrier and camming surfaces for urging the pins resiliently inwardly of the carrier as the carrier urging means descends upon the carrier, the pins then being released when the pin carrier and carrier urging means are in assembled positions, the carrier urging means having shoulders for engaging beneath the pins to enable the urging means to raise the pin carrier away from the support.

* * * * *